T. HANLEY.
Lawn-Edge Mower.

No. 223,505. Patented Jan. 13, 1880.

WITNESSES:
Henry N. Miller
C. Sedgwick

INVENTOR:
T. Hanley
BY Munn & Co
ATTORNEYS.

UNITED STATES PATENT OFFICE.

TIMOTHY HANLEY, OF BOSTON HIGHLANDS, MASSACHUSETTS.

LAWN-EDGE MOWER.

SPECIFICATION forming part of Letters Patent No. 223,505, dated January 13, 1880.

Application filed November 21, 1879.

*To all whom it may concern:*

Be it known that I, TIMOTHY HANLEY, of Boston Highlands, in the county of Suffolk and State of Massachusetts, have invented a new and useful Improvement in Lawn-Edge Mowers, of which the following is a specification.

Figure 1:
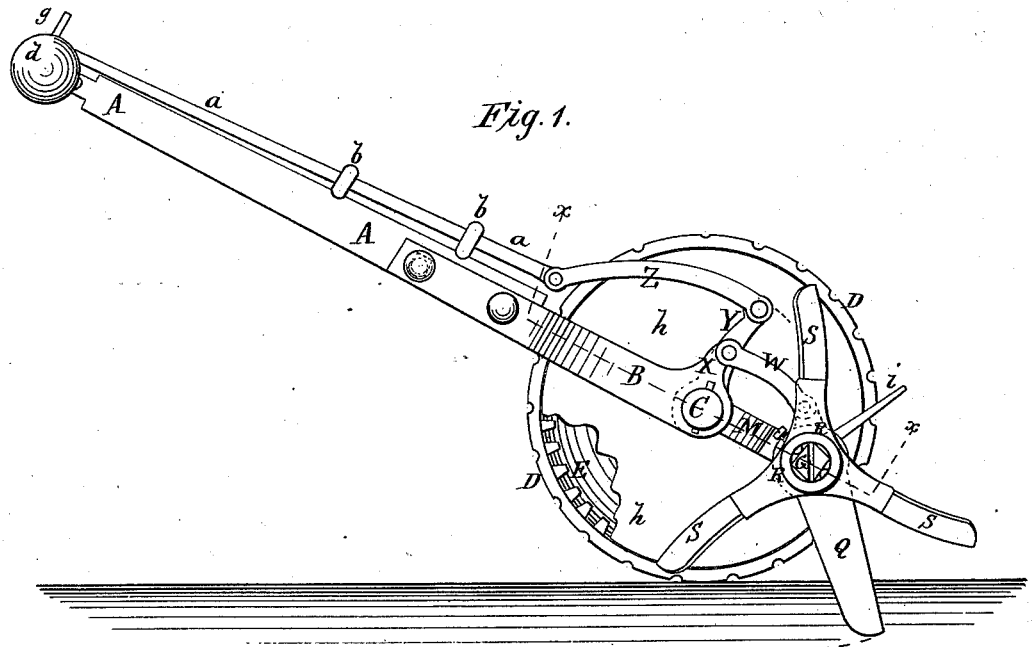
Figure 2:
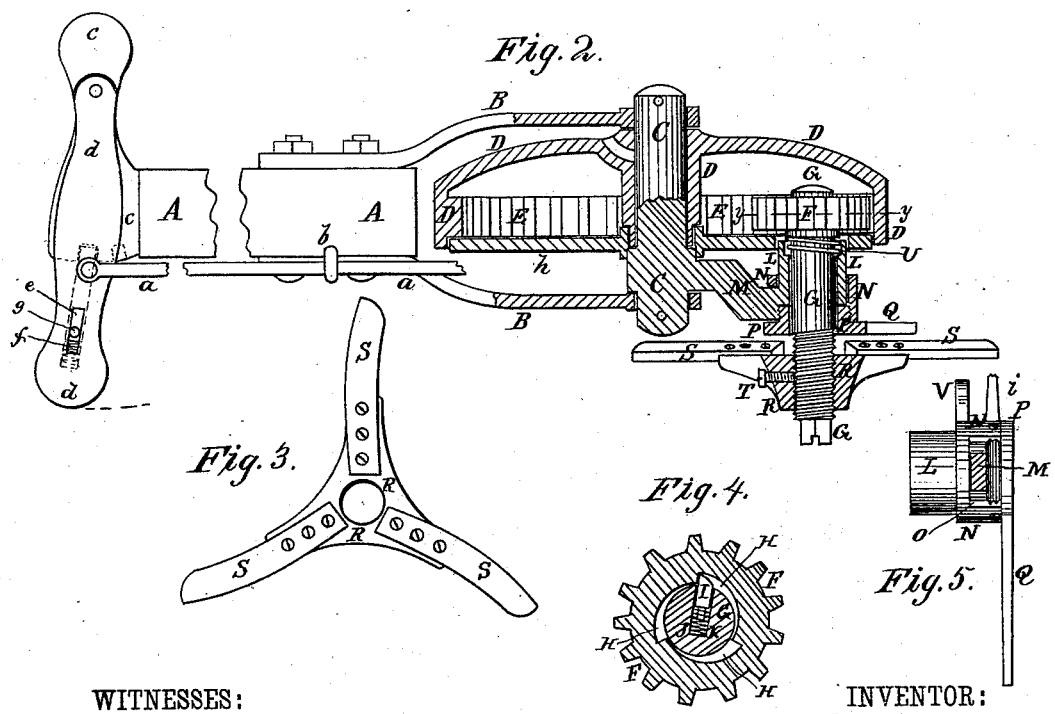
Figure 3:
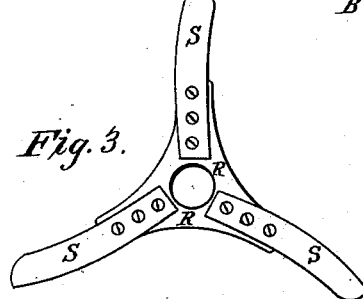
Figure 4:
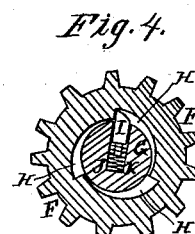
Figure 5:
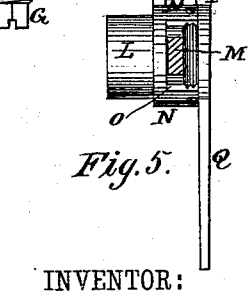

Figure 1 is a side elevation of my improvement. Fig. 2 is a sectional plan view taken through the line $x\,x$, Fig. 1. Fig. 3 is a side elevation of the rotary knives. Fig. 4 is a sectional elevation taken through the line $y\,y$, Fig. 2. Fig. 5 is sectional elevation, showing the stationary knife and its hub and sleeve.

The object of this invention is to improve the construction of the lawn-edge mowers for which Letters Patent No. 220,829 were granted to me October 21, 1879, so that they may be used for mowing both high and low edges, as may be required.

The invention consists, essentially, in the combination, with the handle, drive-wheel, axles, and knives, of devices for adjusting the knife-axle and knives, so that the same machine may be used for mowing high and low edges, as will be hereinafter fully described.

Similar letters of reference indicate corresponding parts.

A represents the handle of the machine, which handle may be of any desired or convenient form. The forward part of the handle A is forked, or has arms B formed upon or attached to it. In the ends of the prongs or arms B are formed holes to receive the ends of the main axle C, which may be secured in place by linchpins, nuts, or other suitable fastenings, or may be used without other fastenings than a shoulder formed upon the said axle C, to rest against the inner side of one of the arms B, the other arm resting against the wheel D. Upon the axle C revolves the hub of the drive-wheel D, the face of which is made wide, and is corrugated or roughened to prevent it from slipping upon the sod. The wheel D is made dish-shaped or open upon one side, as shown in Fig. 2, and upon the inner surface of its flange or tread are formed, or to it are attached, gear-teeth E, into which mesh the teeth of the small gear-wheel F. The gear-wheel F revolves upon an axle, G, and has three (more or less) ratchet-teeth, H, formed in the inner surface of its hub, to engage with the pawl I, placed in a mortise, J, in the axle G, so that the said gear-wheel F may carry the said axle G with it in its revolution when the machine moves forward, but not when the machine moves to the rearward.

The inner end of the pawl I may be notched to receive a spiral spring, K, the inner end of which rests upon the bottom of the mortise J in the axle G, so as to hold the pawl I out against the inner surface of the hub of the gear-wheel F and cause it to engage with the ratchet-teeth H of the said gear-wheel F.

If desired, a half-elliptic or other shaped spring may be used in place of the spiral spring K, in which case the inner end of the pawl I need not be notched. The rear side of the outer end of the pawl I is beveled, to cause it to slide more easily over the ratchet-teeth H of the gear-wheel F. The axle G revolves in a bearing, L, formed in the outer end of an arm, M, formed upon or rigidly attached to the axle C.

Upon the outer part of the bearing L is placed a sleeve, N, which has a notch, O, in its outer edge to receive the arm M, the said notch O being made long, so that the sleeve N may have a reciprocating rotary movement upon the bearing L. In the inner surface of the outer end of the sleeve N is formed a screw-thread to receive a screw-thread formed upon the outer surface of the inner end of the hub P of the stationary knife Q.

The connection between the hub P and the sleeve N may be made more secure, if desired, by one or more set-screws; or the screw-threads may be omitted and the end of the hub P slipped into the end of the sleeve N and secured by set-screws.

Upon the outer part of the axle G is formed a screw-thread, to receive a screw-thread formed upon the inner surface of the hub R, to which are attached, or upon it are formed, three (more or less) knives, S. The hub R is kept from turning upon the axle G by one or more set-screws, T, which pass in through the said hub R, and their inner ends enter longitudinal grooves in the sides of the axle G. The end of the axle G is squared and has a slot cut in it, so that it may be held stationary by means of a wrench or screw-driver while screwing the hub R on and off.

U is a spiral spring placed upon the axle G in a rabbet in the inner end of the bearing L, and resting against a shoulder formed upon the said axle G. The spring U should have sufficient strength to hold the rotary knives S in against the stationary knife Q under ordinary circumstances, but which, should the said knives encounter a nail or other substance that they cannot cut, will yield and allow the rotary knives S to move outward to prevent the knives from being broken.

To the sleeve N is attached, or upon it is formed, an arm or lug, V, to which is pivoted the end of a short connecting-bar, W. The other end of the bar W is pivoted to an arm or lug, X, formed upon or attached to the upper side of the end of the arm B of the handle A. To the main axle C is rigidly attached, or upon it is formed, an upwardly-projecting arm, Y, to the end of which is pivoted the end of a rod, Z. The other end of the rod Z is jointed to the end of the rod $a$, which passes up along the side of the handle A and works in keepers $b$ attached to the said handle.

By this construction, by operating the rod $a$ the main axle C will be turned to raise or lower the knife-axle G, and with it the knives Q S, according as a high or low edge is to be mowed. As the knife-axle G is raised or lowered the pivoted bar W turns the hub P and sleeve N, and thus keeps the stationary knife Q at the proper angle.

To the upper end of the handle A is attached the stationary part $c$ of the hand-piece. The movable part $d$ of the hand-piece is hinged to the stationary part $c$, and is provided with a bolt, $e$, which is placed in a hole or groove in the said part $d$, and its forward end enters one or another of the holes formed in the part $c$ to receive it. The bolt $e$ is held forward by a coiled spring, $f$, which is placed in a cavity in the said part $d$ and presses against the rear end of the said bolt $e$. Upon the rear end of the bolt $e$ is formed, or to it is attached, an arm, $g$, to serve as a handle for drawing back the bolt $e$ when desired.

The outer end of the rod $a$ is pivoted to the movable part $d$ of the hand-piece, so that it may be operated to adjust the stationary knife Q by adjusting the movable part $d$ of the hand-piece.

If desired, the hand-piece may be made rigid, and the rod $a$ secured, when adjusted, by a notched catch or other suitable fastening attached to the handle A.

The open side of the wheel D is closed by a plate, $h$, through the center of which the main axle C passes, and which may be secured to the said axle C by screws or other suitable means. The plate $h$ has a hole formed through it near one edge for the passage of the knife-axle G. The plate $h$ prevents grass from entering the cavity of the wheel D and clogging the gear-teeth, and at the same time forms a second bearing for the knife-axle G.

To the sleeve N, or to the hub P of the stationary knife Q, may be attached, or upon it may be formed, a guard-finger, $i$, to bring the grass into proper position to be struck and cut by the revolving knives S.

Having thus fully described my invention, I claim as new and desire to secure by Letters Patent—

1. In a lawn-edge mower, the combination, with the main axle C, that carries the bearing L of the knife-axle G, of the arm Y and the jointed rod Z $a$, substantially as herein shown and described, for adjusting the position of the knife-axle G, as set forth.

2. In a lawn-edge mower, the combination, with the handle A B and the stationary knife Q, of the connecting-bar W, substantially as herein shown and described, for regulating the inclination of the stationary knife Q as its position is changed, as set forth.

3. In a lawn-edge mower, the combination, with the bearing L of the knife-axle G and the hub P of the stationary knife Q, of the sleeve N, substantially as herein shown and described, for connecting the said hub and bearing adjustably, as set forth.

TIMOTHY HANLEY.

Witnesses:
T. J. McCARTHY,
JOHN H. BURKE.